United States Patent [19]
Webster

[11] 4,065,944
[45] Jan. 3, 1978

[54] CYCLE PUMP SECURITY SYSTEM

[76] Inventor: James A. Webster, 100 W. 94th St., New York, N.Y. 10025

[21] Appl. No.: 667,085

[22] Filed: Mar. 15, 1976

[51] Int. Cl.² .................................................. E05B 73/00
[52] U.S. Cl. ........................................ 70/58; 70/DIG. 57
[58] Field of Search ................ 70/14, 57, 58, 232, 70/233, 229, 230, 19, DIG. 34, DIG. 57

[56] References Cited

U.S. PATENT DOCUMENTS

| 1,760,977 | 6/1930 | Duffy | 70/232 |
| 3,867,822 | 2/1975 | Morse | 70/164 |

FOREIGN PATENT DOCUMENTS

| 888,041 | 8/1943 | France | 70/58 |
| 1,044,432 | 6/1953 | France | 70/58 |
| 455,796 | 3/1950 | Italy | 70/58 |
| 234,012 | 8/1944 | Switzerland | 70/58 |

*Primary Examiner*—Robert L. Wolfe
*Attorney, Agent, or Firm*—Charles A. Malone

[57] ABSTRACT

This invention relates to a method and apparatus for securing a cycle pump. The apparatus consists of a C-shaped holding means adjustably adopted so as to be tightly fitted around the pump body. Lips protrude from the C-shaped holding means and are adaptably fitted to receive a locking means. A cover means is fittingly adapted to permit entry of the lips through the cover means, whereupon the shoulder of the cover is forced against the pump head. This causes the pump body and head to become wedged into the cycle frame pegs. Placing a lock through the lips, which contains holes, prevents the pump from becoming unwedged, thus securing the pump.

10 Claims, 8 Drawing Figures

CYCLE PUMP SECURITY SYSTEM

BACKGROUND OF THE INVENTION

1. Field of the Invention

This invention is concerned with a lock for cycle pumps. It is particularly directed to securing a cycle pump between two pegs installed on a cycle frame.

Due to rising gasoline prices and the desire of Americans to remain physically fit, the number of bicycle riders continues to increase. Production of bicycles has also increased.

Bicycle riders frequently must carry equipment for making emergency road repairs. A cycle pump is often carried so that flat tires can be repaired and inflated.

Generally no means are provided on cycles for concealing accessory equipment, including cycle pumps. Many cycle pumps are stolen annually.

Cycles generally contain means for storing cycle pumps. Since no simple, efficient locking means is available, removal of cycle pumps is generally easily accomplished. Often this removal is accomplished by unscrupulous persons. It is for this reason that applicant has invented a lock for cycle pumps.

2. Description of the Prior Art

U.S. Pat. Nos. 1,329,784 and 1,338,512 issued in 1920, to A. P. Lundin. His inventions were directed to a locking apparatus for attaching and securing a cycle pump to a cycle frame.

U.S. Pat. No. 1,329,784 issued to A. P. Lundin on Feb. 3, 1920. This invention consisted of a clamp means for engaging the lower end or barrel of the pump; a second clamp into which the pump barrel was snapped; and a member engaging the upper end of the pump when bridging the upper end of the pump and the second clamp means. The engaging member, through a locking means, is combined with the second clamp to lock the pump.

Lundin's second patent, U.S. Pat. No. 1,338,512, was similar to U.S. Pat. No. 1,329,784 except that one clamp was used to secure the pump to the cycle frame.

U.S. Pat. No. 1,329,784, contained a cylindrical guide which was adopted to receive a lock yoke. This lock yoke contained a compressed spring at one end.

Lundin's inventions contained one clamp means for securing and holding a cycle pump in place. As previously mentioned a spring means was provided in the locking means so that the hooked stem end could be adjusted to fit over the end of the pump.

After the stem was adjusted, the hinged locking means was swung into place and locked. The pump was secured by preventing the pump's head from being extended. Its removal was thereby prevented.

Applicant's improved security system locks a cycle pump between two clamps on a cycle frame. Pressure is exerted on the pump's shoulder and barrel, causing the pump to become wedged between two pegs. Placing a telephone lock into applicant's apparatus prevents the pump from being loosened. Its removal is thus prevented.

It is an object of this invention to provide a simple, uncumbersome and inexpensive device which can be used to secure a cycle hand pump to a cycle frame.

It is a further object of this invention to provide an effective form of a cycle pump lock which will be inexpensive to manufacture and unlikely to get out of working order.

Other additional objects of this invention will become apparent upon a consideration of this entire specification including the drawing and claims.

SUMMARY OF THE INVENTION

Applicant has discovered a system for securing a cycle pump between two cycle pegs. This system uses a telephone lock; a C-shaped holding means with protruding lips at one end; and a cover means fittingly adapted to receive the C-shaped holding means. The C-shaped holding means is fitted around the pump which is held between the pegs, whereupon the cover means is forced over it. This causes the pump to become wedged between the pegs. A lock, usually a telephone lock, is placed through the lips which contain holes, thus securing the pump.

Figures 1, 2, 3, 4, 5:
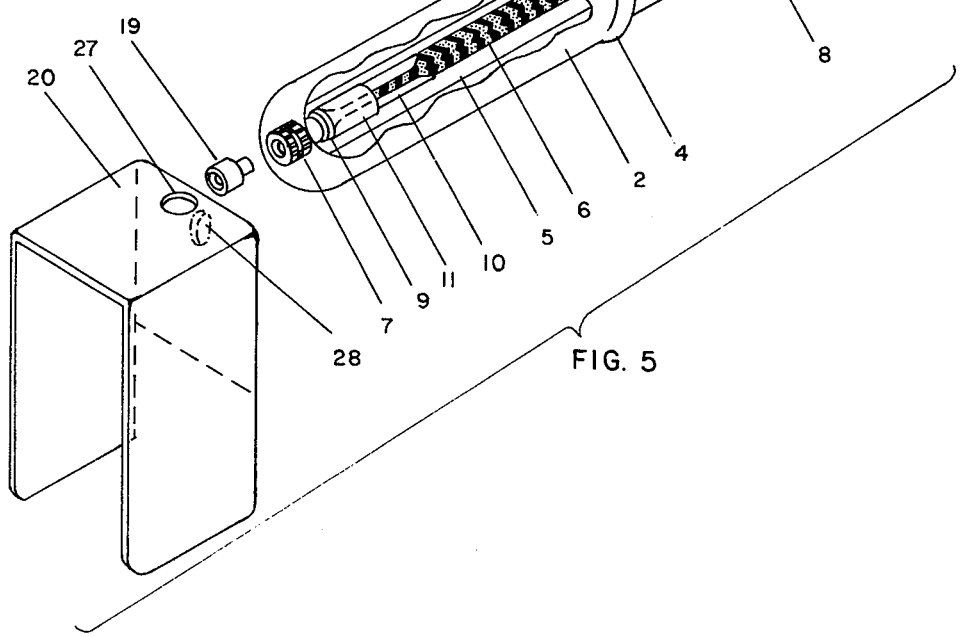
FIG. 1 is a sideview of the C-shaped clamp 12 showing the holes 13 for receiving the telephone lock 14. As shown the largest hole is nearest the viewer.

A side view of the C-shaped clamp 12 is portrayed in FIG. 2. The clamp is depicted to show the opposite side of the clamp with the smallest hole toward the viewer. This hole receives the smallest end of the telephone lock 14, which end contains the lever for locking said lock to the C-shaped clamp.

A front view of the C-shaped clamp 12 is shown in FIG. 3. This view shows the threaded screw 15 fitted through a flat washer 23, a spacer 24, a lock washer 22, and a nut 15. Flexible material 25 is fitted around the pump barrel 3 to prevent slippage and scarring of the pump barrel.

FIG. 4 shows a side view of the C-shaped clamp 12 fitted around the pump barrel 3.

A cutaway view (FIG. 5) depicts the flexible air hose 6 as it is stored in the receptacle 5. This figure also shows the relationship of the pump to the peg hardware security shield 20 which contains a peephole 27. The peg receptacle 19 is fitted through the peg hardware security shield mounting hole 28. This figure represents one embodiment of my invention.

Figure 6:
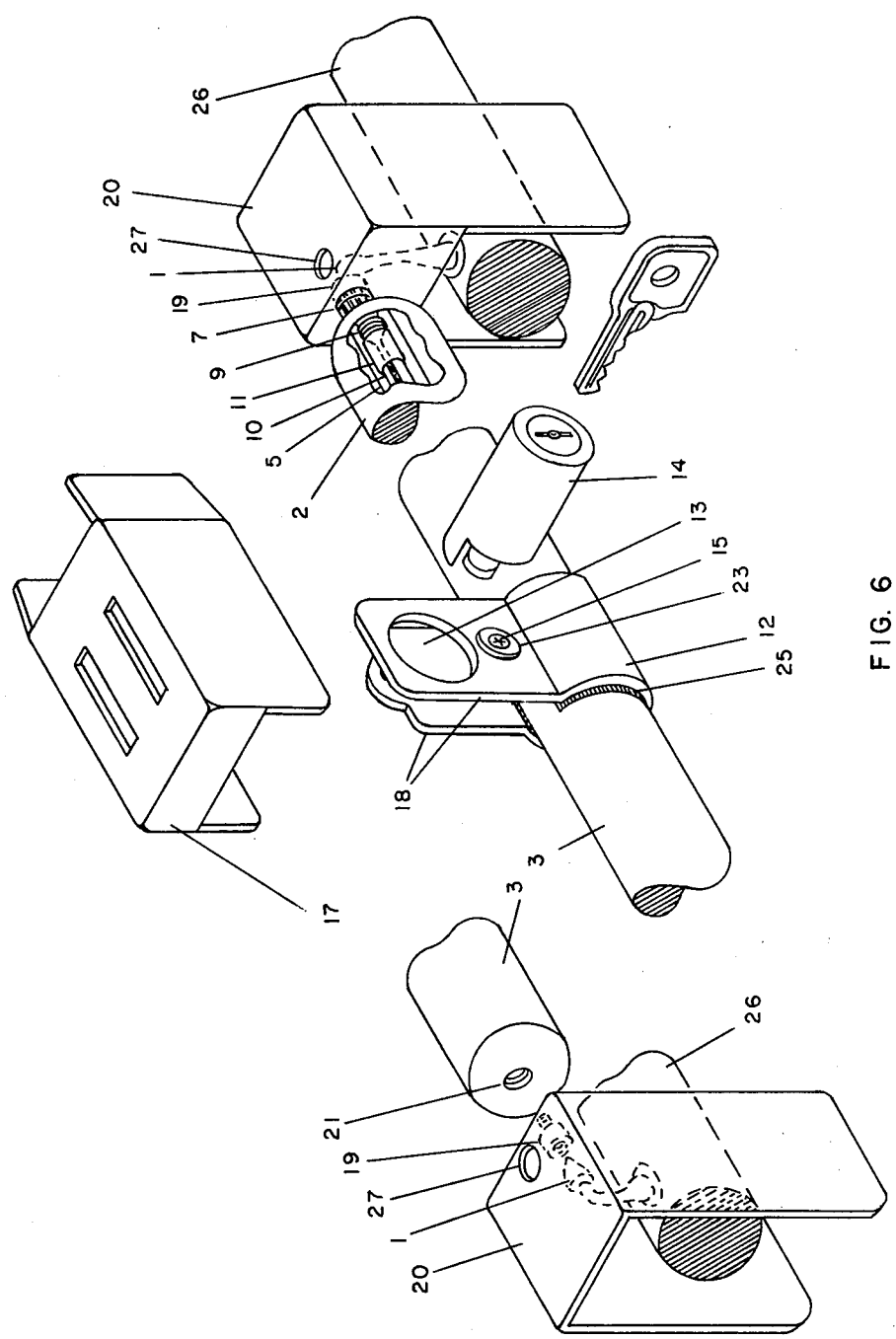

FIG. 6 shows an exploded view of my invention and its relationship to a cycle frame 26.

Figure 7:
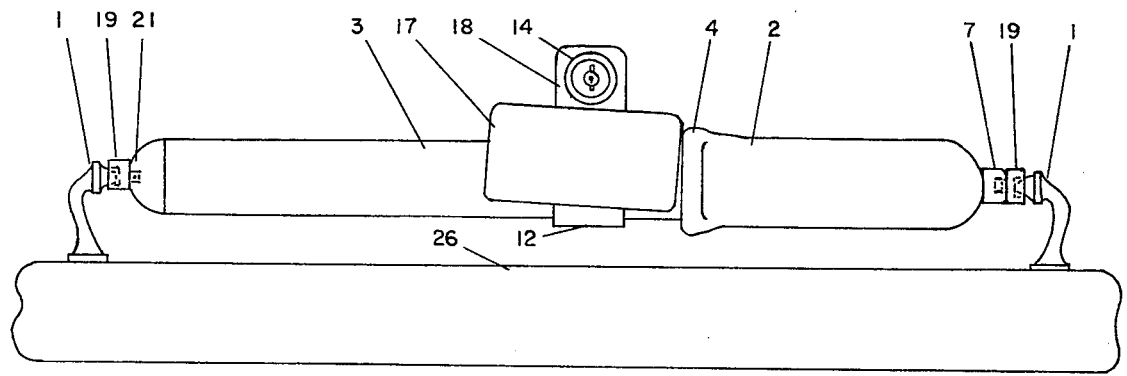

A side view, in FIG. 7, shows the preferred embodiment of my invention. This figure shows a cycle pump, with my invention attached to it, fitted between built-in pegs on a cycle frame 26.

Figure 8:
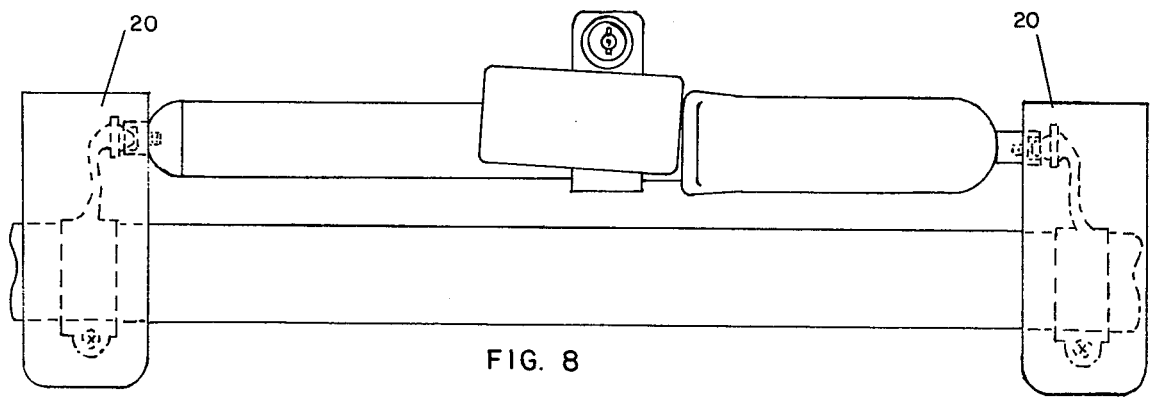

Another embodiment of my invention is depicted in FIG. 8, which is a side view. This figure depicts a cycle pump, with my invention attached, securely locked between pegs. As shown these pegs have been added to the cycle frame as an accessory. The peg hardware security shield 20 prevents removal of the screw which is used to affix the accessory pegs to a cycle frame.

PREFERRED EMBODIMENT

A preferred embodiment comprises a pump fitted into a bicycle frame having pegs 1 for holding or retaining the pump.

The pump comprises an upper end 2 or head and a lower end 3 or pump barrel.

One end of the head 2 contains a shoulder 4. In the head's opposite end a receptacle 5 is formed for receiving and storing a flexible air hose 6. This receptacle is hollow and rod shaped.

Generally, the air hose 6 will have two ends. One end is a threaded female member 7 which is adapted to fit over a threaded Schroeder valve. The other end contains a threaded male member 8 designed to fit into a threaded receptacle in the lower end of the pump barrel.

When not in use the flexible air hose 6 is stored in the hollow receptacle 5 located in the pump head 2. When so stored the entire flexible air hose 6, with the exception of the female member 7, is concealed.

To prevent the threaded female member 7 from being forced into the receptacle 5 the flexible tube 6 is fitted through a hose security ring 9. The diameter of the security ring 9 is larger than the receptacle opening 5.

Below this ring 9 is positioned a hose retaining spring sleeve 10 which fits around the flexible hose 6. The hose retaining spring sleeve 10 is fitted into and through a security auxillary sleeve 11. When positioned into the pump head receptacle 5 this combination of sleeves causes the clearance in the pump head receptacle to become substantially reduced. This prevents the flexible tube 6 from being flexed when in its stored position. It thus becomes very rigid. This rigidity prevents the female threaded member 7 from changing its position.

To secure the cycle pump onto the frame the pump is compressed and released between two security pegs 1, positioned on the frame.

A C-shaped holding means 12 containing holes 13 to receive a telephone lock 14, protrudes from each end of the C-shaped holding means 12. This C-shaped member 12 is positioned over the pump barrel 3 just below the pump head shoulders 4.

A threaded screw 15 is positioned through the lips and under the holes 19 for receiving the lock 15. A nut 16 is fitted over the screw and adjusted so as to cause the C-shaped 12 member to become tightened against the pump barrel 3.

A cover means 17, fittingly adapted so as to permit the parallel lips 18 of the C-shaped member 12 to proceed through the cover means 17, is placed over the cover means 17. This causes the lips of the C-shaped member 12 to become forced up against the pump shoulder 4.

Pressure is thus exerted through the pump head 2 and barrel 3. This pressure causes the pump to become wedged between the security pegs 1.

A telephone lock 14 is then placed through the holes 13 contained in the lips 18. When locked the telephone lock 14 prevents the cover means 17 through which the lips 18 protrude, from being removed from its fixed position.

To better secure the pump and protect the threads, in each end of the pump is inserted a peg receptacle 19. This is used in one embodiment of my invention.

Another embodiment of my invention deploys a peg hardware security shield 20 at each end of the pump between the peg receptacle 19. One peg hardware security shield is deployed between the peg receptacle 19 and the female threaded member 7. The other shield is deployed between the peg receptacle 19 and the female threaded opening 21 in the lower end of the pump barrel 3.

What is claimed is

1. In an improved method for securing a cycle pump where the pump is held between two pump pegs and a flexible tube, having a threaded male member, which is stored in the pump head and where the pump barrel contains a threaded female receptacle for receiving the threaded male member, the improvement which comprises an improved security system comprising
   a. placing the pump in a C-shaped holding means containing lips having holes which means is adaptably fitted around the pump;
   b. covering the C-shaped holding means with a cover means adaptably fitted to receive the holding means and contact the shoulder of the pump head via forward end lip means;
   c. forcing the cover means against the shoulder of the pump;
   d. causing the threaded male member of the flexible base to become wedged against one pump peg;
   e. causing the threaded female receptacle of the pump barrel to become wedged against the other pump peg;
   f. locking the C-shaped holding means by placing a lock through holes contained in the lips.

2. A method as claimed in claim 1 wherein a peg is placed in the end of threaded female member located in the pump head.

3. A method as claimed in claim 2 where a peg receptacle is placed in the threaded female receptacle located in the pump barrel.

4. A method as claimed in claim 3 where a peg hardware security shield containing a hole located to receive the peg is placed between the pump peg and the peg receptacle.

5. A method as claimed in claim 4 where the lock is a telephone lock.

6. In an improved apparatus for securing a cycle pump where the pump is held between two pump pegs and a flexible tube, having a threaded male member, which is stored in the pump head and where the pump barrel contains a threaded female receptacle for receiving the threaded male member, the improvement comprising
   a. a C-shaped holding means adjustably fitted around the pump body wherein the C-shaped holding means has parallel lips protruding from its open ends where the lips are adaptably fitted to receive a locking means;
   b. a cover means fittingly adapted to permit the parallel lips to proceed through said cover means causing the cover means to be forced against the shoulder of the pump head thereby preventing the pump's removal when a locking means is placed through the lips which contain holes.

7. An apparatus as claimed in claim 6 where peg receptacles are placed in the end of the threaded female member.

8. An apparatus as claimed in claim 7 where a peg receptacle is placed in the threaded female receptacle located in the pump barrel.

9. An apparatus as claimed in claim 8 where a peg hardware security shield containing a hole adapted to receive the peg is placed between the pump peg and the peg receptacle.

10. An apparatus as claimed in claim 9 where the locking means is a telephone lock.

* * * * *